Figure 1:
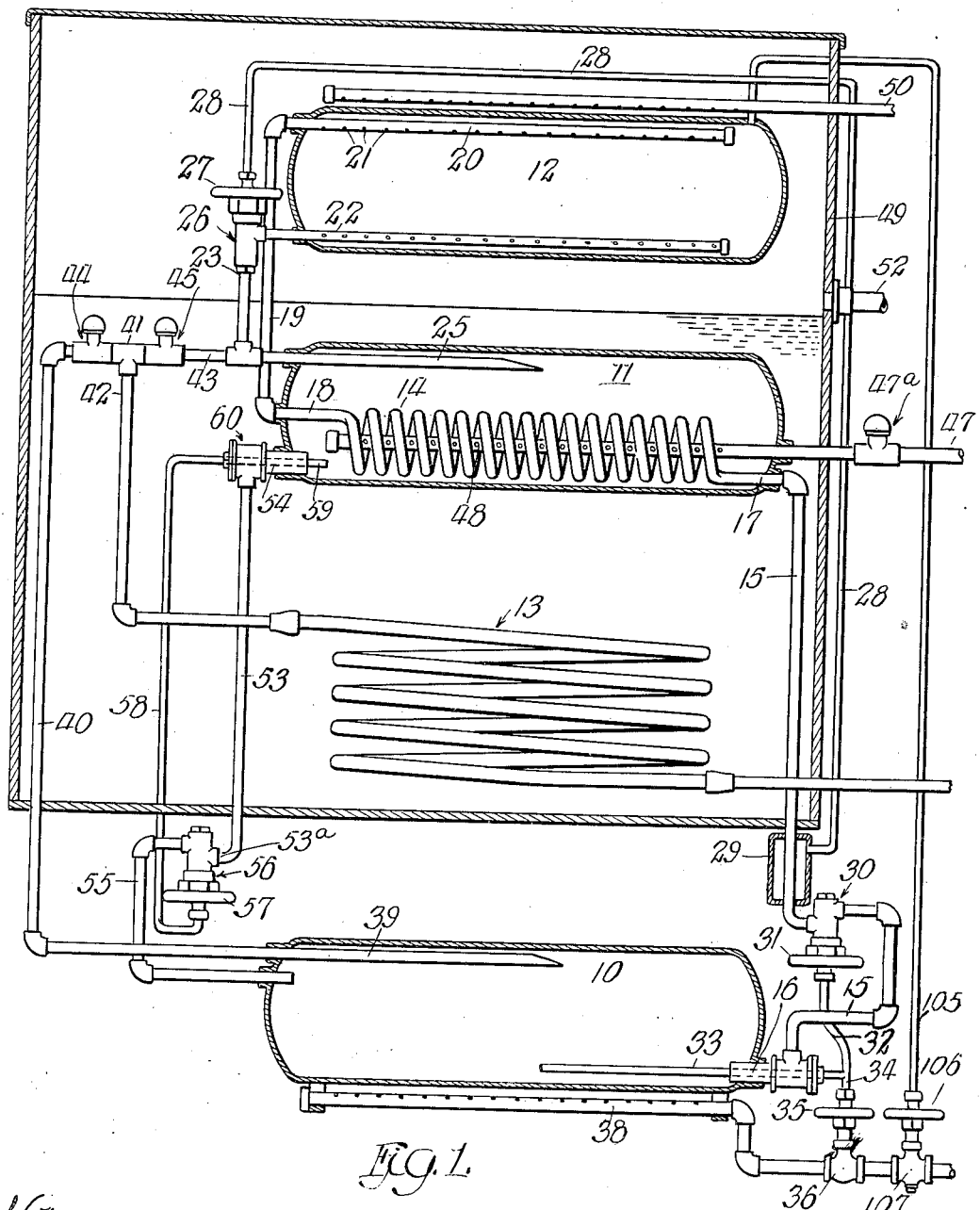

H. H. SOUTHWORTH & C. G. ARMSTRONG.
REFRIGERATING APPARATUS.
APPLICATION FILED NOV. 6, 1912.

1,109,021. Patented Sept. 1, 1914.
2 SHEETS—SHEET 2.

Witnesses:

Inventors
Harrison H. Southworth
Charles G. Armstrong
by Brown & Mekellop Attys

UNITED STATES PATENT OFFICE.

HARRISON H. SOUTHWORTH, OF CLEVELAND, OHIO, AND CHARLES G. ARMSTRONG, OF ATLANTIC HIGHLANDS, NEW JERSEY, ASSIGNORS, BY MESNE ASSIGNMENTS, TO THE ICELESS REFRIGERATION COMPANY, OF CLEVELAND, OHIO, A CORPORATION OF OHIO.

REFRIGERATING APPARATUS.

1,109,021.      Specification of Letters Patent.      Patented Sept. 1, 1914.

Original application filed June 14, 1912, Serial No. 703,596. Divided and this application filed November 6, 1912. Serial No. 729,717.

*To all whom it may concern:*

Be it known that we, HARRISON H. SOUTHWORTH and CHARLES G. ARMSTRONG, citizens of the United States, and residents, respectively, of Cleveland, in the county of Cuyahoga and State of Ohio, and of Atlantic Highlands, in the county of Monmouth and State of New Jersey, have invented certain new and useful Improvements in Refrigerating Apparatus; and we do hereby declare that the following is a full, clear, and exact description thereof, reference being had to the accompanying drawings, and to the letters of reference marked thereon, which form a part of this specification.

This invention relates to improvements in refrigerating apparatus of the absorption type, and consists of the matters hereinafter described and more particularly pointed out in the appended claims.

In carrying out our invention, we provide a still and an absorber, and in addition another vessel adapted to act as an intermediary container in the transposition of contents between the still and the absorber and which, in the embodiment of the apparatus illustrated in the drawings, is adapted to hold the weak absorbent while the strong saturated absorbent is being taken from the absorber and put into the still.

While the invention is not limited thereto, we prefer to use water as the absorbent and ammonia as the refrigerant and in hereinafter describing our invention we shall refer for convenience to such absorbent and refrigerant alone.

In the apparatus shown in the drawings the contents of the still are heated to a predetermined temperature corresponding with and indicating that the liquor therein has been reduced to the intended stage of weakness, when the hot weak liquor is conveyed to the intermediary container. The strong liquor in the absorber is then taken from the absorber to the still and the weak liquor is then transposed from the intermediary container to the absorber. Suitable connections are provided between the several vessels constituting the parts mentioned and automatic devices are provided to open communication between the several vessels referred to so as to permit the interchange described.

The apparatus herein described is designed to carry out the process described and claimed in an application filed by us on June 14th, 1912, Serial No. 703,596, of which the present application is a division.

Figure 2:
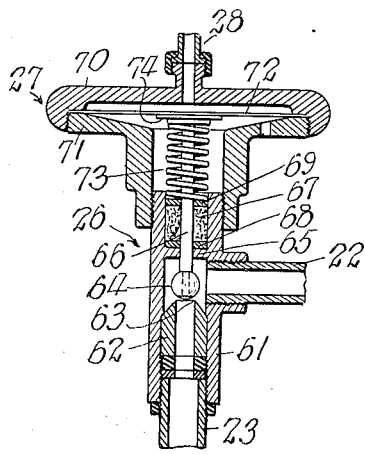
Figure 3:
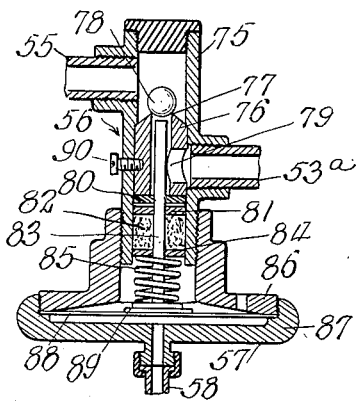
Figure 4:
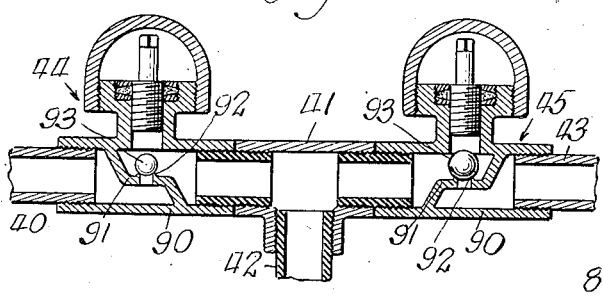
Figure 6:
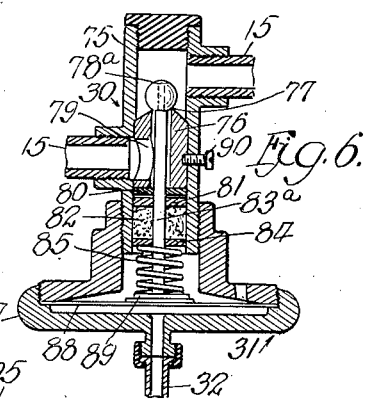
Figure 5:
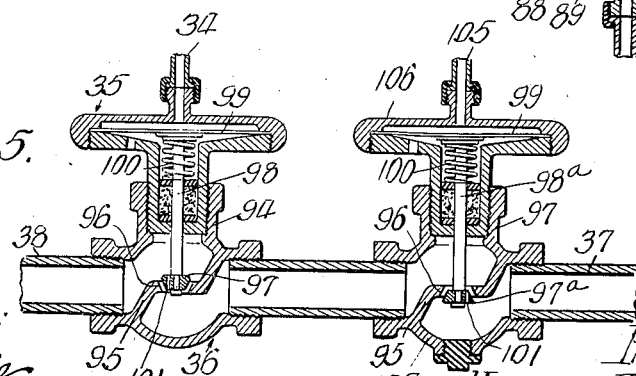

In the drawings:—Figure 1 is a view representing a vertical section through an apparatus made in accordance with our invention. Fig. 2 is a view representing a vertical central section through one of the thermostatically operated valves. Fig. 3 is a view representing a vertical central section through another form of thermostatically operated valves used in this apparatus. Fig. 4 is a view representing a vertical longitudinal section through the check-valves located at the inlet end of the pipe, leading to the condenser receiver coil. Fig. 5 is a vertical longitudinal section through the thermostatically controlled fuel gas supply valves. Fig. 6 is a view representing a vertical central section through a third form of thermostatically operated valve used in the apparatus.

Referring now to the drawings, 10 indicates a still or generator which may be of any convenient construction and as shown consists of an elongated closed drum made of metal. This generator, as will presently appear, is heated during a time interval and then remains at rest during a succeeding interval of time, when it is again heated, the intervals when it is acting as a still and when it is at rest alternating with each other. 11 indicates a second drum which is intended to act as an absorber. 12 indicates still another drum which, as will appear, acts in the embodiment of the invention shown in the drawings, as an intermediary container for receiving and holding the weak liquor during the transposition of the strong liquor from the absorber 11 to the still 10.

13 indicates a condensing and receiving coil in which the ammonia gas is condensed and retained and from which it passes to the refrigerating coils in a familiar manner.

In the absorption drum 11 is located a coil 14 which, as shown, extends from end to end of said drum.

15 indicates an upright pipe leading from the bottom of the still to the bottom of the absorption drum and being connected at the still end with a short pipe 16 that projects into the still and at the absorber end with the inlet end 17 of the coil 14. The outlet end 18 of the coil 14 extends through the opposite end of the absorption drum 11 and is connected to an upright pipe 19 leading to the intermediary drum 12 and connected with a pipe 20 which extends longitudinally through the top of said drum. Said pipe 20 has perforations 21 on its lower side. The intermediary drum 12 is connected with the absorption drum 11 by an upright pipe 23 which connects at its upper end with a perforated pipe 22 extending longitudinally through the intermediary drum near its bottom and connects at its lower end with a pipe 25 extending into the absorption drum 11 near its top.

26 indicates a normally open valve interposed in the pipe 23 and adapted, as shown herein, to be closed by a thermostatically operated device (the construction to be described more particularly later). Said valve controls the flow from the intermediary drum 12 to the absorption drum 11. 27 indicates a casing containing a diaphragm for operating said valve and 28 indicates a pipe communicating with said diaphragm casing and connected at its other end with a closed shell 29 surrounding the pipe 15 that leads from the still 10 to the absorption drum 11. Said shell 29 is located near the lower end of the pipe 15 adjacent the point where it is connected with the still 10. Said shell 29 and pipe 28 are adapted for containing an expansible thermostatic fluid which is readily affected by changes in temperature.

30 indicates a normally closed valve interposed in the pipe 15 near the lower end thereof and adapted to be controlled by a diaphragm in a casing 31 connected by a pipe 32 with a pipe 33 extending into the still. Said pipe 33 is closed at its inner end and contains a thermostatic fluid adapted to be affected by changes of temperature. As shown, the pipe 33 extends through a T-fitting connecting the pipes 15 and 16 and through the pipe 16. The thermostatic pipe 33 is also connected with a second pipe 34 opening into a casing 35 containing a diaphragm which controls the operation of a valve 36. Said valve 36 controls the flow of fuel-gas from a supply pipe 37 to a burner pipe 38 located below the still.

39 indicates an ammonia gas discharge pipe in the top of the still, open at its inner end and projecting through the end wall of the still. Said discharge pipe connects with a pipe 40 which is connected by a T-fitting 41 with a pipe 42 leading to the condensing and receiving coil 13. The pipe 42 is also, as shown herein, connected by the T-fitting 41 with a pipe 43 which connects with the pipe 25 in the top of the absorption drum 11. As shown, the connection is made by a T-fitting which also connects the pipe 25 with the pipe 23 that leads from the intermediary drum 12.

44, 45 indicate check-valves located, respectively, in the pipe 40 and in the pipe 43 on each side of the T-fitting 41 connected to the pipe 42 which leads to the condensing and receiving coil 13. Each check-valve is adapted to permit a flow toward the pipe 42 but to prevent a return flow therefrom.

A pipe 46 leads from the outlet end of the condensing and receiving coil 13 to the refrigerating coils (not shown) and a return pipe 47 leads the expanded ammonia gas from said refrigerating coils to the absorption drum 11, being connected to a perforated suction pipe 48 located near the bottom of the absorption drum and as shown extending through the coil 14 therein.

The absorption drum 11 and the still 10 are connected by a pipe 53, which has connection at its upper end with a pipe 54 that opens into the absorption drum near its bottom and has connection at its lower end with a pipe 55 that opens into the still near its top.

56 indicates a valve interposed in the pipe 53 to control the flow therethrough. As shown herein, said valve is thermostatically controlled, 57 indicating a casing containing a diaphragm for operating said valve 56 and said casing being connected with a pipe 58 containing a thermostatic fluid and having an end 59 extending into the absorption drum 11. The end of said thermostatic pipe extends through a T-fitting 60, that connects the pipes 53 and 54, and through the pipe 54.

The liquid ammonia receiving coil, the absorption drum and the intermediary drum 12 are inclosed in a tank 49 adapted for containing cooling water. Cooling water is supplied from a pipe 50 which extends longitudinally above the intermediary drum 12 and is provided with perforations through which the water is discharged on said intermediary drum. As shown, the drums 12, 11 and the condensing and receiving coil 13 are arranged one above the other and the water which drips upon the intermediary drum in the first instance falls from that into the tank 49 and keeps the water at such level therein that the coil 13 and the absorption drum 11 are covered. An overflow pipe 52 is provided in the tank 49 at a level slightly above the top of the absorption drum 11.

Referring now more in detail to the several valves mentioned, the valve and casing 26 and 27 are as follows, the same being shown in vertical central section in Fig. 2: The valve 26 consists of a tube 61 in the lower end of which is secured a tubular valve block 62 having at its upper end a valve seat 63. Said valve seat is preferably made of case-hardened steel and is adapted to seat a ball 64 fixed to the lower end of a rod or stem 66. The pipe 23 leading to the drum 11 is secured to the bottom of the tubular valve casing 61 and the pipe 22 is secured to the side of said casing and opens into the same above the valve seat 63. A flow of the contents of the intermediary drum 12 to the absorber drum 11 by gravitation when the valve is open is thus made possible. Above the ball there is formed in the valve casing 61 a partition 65 having an aperture through which the vertical rod or stem 66 extends. 67 indicates a washer or plug of soft elastic material through which said valve stem extends, and 69, 68 indicate metal washers located, respectively, at the upper and lower ends of said plug 67. To the upper end of the valve casing 61 is secured the diaphragm casing 27 which comprises upper and lower members 70, 71 provided with annular flanges which are secured together and which confine between them a diaphragm member 72. The thermostatic pipe 28 is connected to the upper casing member 70 so that the thermostatic fluid in said pipe will come in contact with the diaphragm 72. 73 indicates a spring interposed between the top washer 69 and a plate 74 that engages the bottom of the diaphragm 72. Said spring acts normally to hold the ball 64 above its seat. When, as will presently be described, the temperature of the thermostatic fluid in the pipe 28 is raised to a predetermined point, said fluid will expand through the tube 28 and in the chamber above the diaphragm 72, depressing said diaphragm and with it the stem 66, causing the ball 64 to close on its seat 63.

Fig. 3 shows a vertical central section through the valve 56 and the casing 57. In this case, the valve consists of a tubular valve casing 75 containing within it an apertured valve plug 76 having formed at its upper end a seat 77 adapted to seat a ball-valve 78. Said valve plug has a lateral port 79 which is arranged in line with a pipe 53ª opening laterally into the tube casing 56 and forming part of the pipe connection 53 between the absorption drum 11 and the still 10. 80 indicates a washer threaded into the lower end of the tubular casing 75 in engagement against the bottom of the valve plug 76 and adapted to receive the thrust of an upper washer 81 at the upper end of a block or plug 82 of soft elastic material through which a vertical valve stem 83 extends. 84 indicates a lower washer. To the lower end of the tubular valve casing 75 is secured the diaphragm casing 57, the same comprising upper and lower members 86, 87 which have annular flanges secured together and confining between them a diaphragm 88. A spring 85 extends between the lower washer 84 and a disk 89 which engages the diaphragm. The thermostatic pipe or tube 58 is secured to the casing member 87 and opens into the diaphragm chamber below the diaphragm 88. To prevent the tubular valve plug 76 from rotating in the valve casing and taking its port 79 out of alinement with the pipe 53ª, a set-screw 90 is threaded through the tubular wall of the casing 56 and engaged in a recess in the side of the tubular valve plug. When the thermostatic fluid in the pipe 58 is at normal temperature, the valve stem 83 is held by the spring 85 in a position below the ball 78 so that it has no effect thereon, the ball simply resting upon its seat and acting as a check-valve to prevent a return flow from the still toward the absorption drum 11. When the thermostatic fluid is heated to a predetermined point so as to act upon the diaphragm 88 the stem 83 is raised slightly and the ball 78 raised from its seat, thus permitting a free flow from the absorption drum toward the still.

The construction of the valve 30 and diaphragm casing 31 (see Fig. 6) is substantially identical with that just described, except that the ball 78ª is fixed to the upper end of the stem 83ª, so that the ball moves only with the stem. When the thermostatic tube 33 is heated to a predetermined temperature, the valve, normally held closed by the associated spring, is raised from its seat so as to permit a flow from the still through the pipe 15 to the coil 14 in the absorption drum. When said thermostatic tube cools down again, the spring lowers the stem and with it the ball, which is held against its seat by the spring.

The checks 44 and 45 are shown in Fig. 4 and are of familiar construction comprising each a casing 90 containing a dividing wall 91 having a port with a knife-edge valve seat 92 on which seats a ball-valve 93. Said valve each permit a flow toward the pipe 42 bu prevent a back-flow from said pipe.

The gas controlling valve 36 is shown in section on the left in Fig. 5. This is of familiar construction including a valve casing 94 containing a dividing wall 95 provided with a port and valve seat 96. 97 indicates a valve disk on the end of a stem 98 which is operated by a diaphragm 99 in the diaphragm casing 35 which is similar to those just described. A spring 100 acts to normally hold the valve stem in such position that the valve 97 is off its seat and the parts are so adjusted that when a certain predetermined temperature is reached by the thermostatic fluid in the pipe 33 and 34 the valve is closed upon its seat thus shutting off the gas supply. The valve disk 97 is provided with an aperture 101 adapted to permit a small flow of gas even after the valve is closed so as to retain a pilot flame in the burner 38.

The operation of our improved apparatus is as follows: At the beginning of a cycle the still 10 is charged with strong liquor, the absorption drum 11 contains weak liquor and the intermediary drum 12 is empty. The ammonia gas which has passed through the refrigerating coils and is returning through the pipe 47 enters the suction pipe 48 in the absorption drum and is absorbed by the weak liquor therein. A check-valve 47$^a$ in the pipe 47, which is preferably of the same construction as the check-valves illustrated in Fig. 4, permits a free flow toward the suction pipe but prevents a back-flow from the pipe 48 to the pipe 47. The thermostatic tube 33 being yet below the predetermined temperature at which it acts on the diaphragm 99 in the diaphragm casing 35 to close the gas supply valve, said valve is open fully and the burner 38 is burning at full power below the still. The positively closing valve 30 in the pipe 15 controlling the connection between the still and the coil 14 in the absorption drum is closed and the valve 56 controlling the flow between the still and the absorption drum is on check so as to prevent a flow from the still to the absorption drum. The valve 26 in the pipe 23 connecting the intermediary drum 12 with the absorber drum 11 is open. The still and the absorber continue to act in their respective capacities as such,—ammonia gas being driven off from the still and the ammonia gas coming from the refrigerating coils being absorbed by the liquor in the absorption drum. The ammonia gas driven from the still passes through the pipe 39, the pipe 40, the check-valve 44 and down through the pipe 42 to the condensing and receiving coil 13. The check-valve 45 prevents the ammonia gas from going beyond said valve. When a predetermined temperature is reached in the still 10 corresponding to the weakness of liquor the apparatus is designed to work with, the thermostatic fluid in the pipe 33 expands through the pipe 34 into the diaphragm casing 35, depresses the diaphragm against the action of the spring and causes the fuel gas supply valve to close on its seat, thus turning down the burner to pilot flame. At the same time said thermostatic fluid expands through the pipe 32 into the diaphragm casing 31, raises the stem 83$^a$ and lifts the ball 78$^a$ from its seat, thus permitting a free passage of the hot weak liquor through the pipe 15 toward the coil 14. The passage of the hot weak liquor through the pipe 15 and through the thermostatic casing 29 connected with the thermostatic pipe 28 raises the temperature of the thermostatic fluid therein, which expands into the diaphragm casing 27 and causes the diaphragm 72 to depress the stem 66 and close the ball-valve 64 on its seat, thus positively closing the connection between the intermediary drum 12 and the absorption drum 11. There being at this time a comparatively low pressure in the intermediary drum 12, corresponding to the pressure in the absorber drum 11, with which it was connected prior to the closing of the valve 26, substantially all of the hot weak liquor passes rapidly from the still through the pipe 15, the coil 14 in the absorption drum, and the pipe 19 to the discharge pipe 20 in the top of the intermediary drum, through which it is discharged into said intermediary drum. As the valve 26 is now closed as has just been described, the weak liquor is retained in said drum. As the hot weak liquor passes through the cold liquor in the absorption drum 11, which has now approached the point of saturation, the temperature of said liquor is raised by reason of the heat conveyed from the hot weak liquor to the coil 14, and this rise of temperature increases the pressure in the absorber 11 and is communicated to the end 59 of the thermostatic tube 58, thus causing an expansion of the thermostatic fluid in said tube which acts on the diaphragm in the casing 57 and causes the valve operating stem in said casing to rise and lift the ball-valve from its seat, thereby opening communication between the absorption drum 11 and the still 10. In the passage of the hot weak liquor from the still to the container 12, a part of its heat is lost in the manner already described, so that when it reaches said container it is in condition to absorb such ammonia as is present in said container and as its temperature is further lowered by contact with the cooled drum (which is cooled by the water flowing upon it,) practically all of the ammonia gas therein is absorbed and a partial vacuum is produced in the said container, said partial vacuum extending back through the pipe 19, coil 14 and pipe 15 to the still 10. The pressure in the still, from which substantially all of the hot weak liquor has been discharged, being comparatively much lower than that in the absorption drum containing the now hot strong liquor under pressure, substantially all of said strong liquor flows rapidly from the absorption drum into the still 10. In the meantime, that is to say, in the interim between the passage of the hot weak liquor through the coil 14 and of the raising of the temperature of the thermostatic member 59 so as to open the valve 56 as just described, the thermostatic tube 33 has been cooling so that when the comparatively cooler liquor from the absorption drum comes into the still and into contact with the thermostatic tube 33, the temperature of the thermostatic fluid therein is lowered so that the pressure in the diaphragm casing 31 is no longer capable of holding the ball valve off its seat against the action of the associated spring which resists the upward movement of the stem, and such ball valve is closed on its seat and again acts to prevent the flow of liquor from the still through the pipe 15. Very soon afterward the thermostatic casing 29 has become cool, the pressure on the associated diaphragm is relieved, and the ball of the valve 26 is lifted from its seat by the associated spring, thus opening communication between the intermediary drum 12 and the absorber 11. When the valve 26 is opened as already described the ammonia gas in the absorber 11, being under high pressure, rushes into the container 12 through the pipe 23 and perforated pipe 22 and being rapidly absorbed by the weak liquor therein, a balance of pressure between the absorber and the intermediary container is produced, whereupon the weak liquor flows by gravity into the absorber, and there acts in the usual way to absorb the ammonia gas returning from the refrigerating coils. We now have weak liquor in the absorber drum 11 ready to absorb the ammonia gas returning from the refrigerating coils and strong liquor in the still 10 ready to be heated to drive off ammonia gas to the liquid receiving and condensing coil 13, and the pressure in the diaphragm casing 35 and the diaphragm controlling the fuel gas supply valve 36 having been relieved at about the same time that the pressure was relieved in the diaphragm casing 31 to permit the closing of the valve 30 the burner 38 is again burning with full power under the still 10 and we have the same conditions with which we started the operation, as first described.

The connection of the pipe 25 in the top of the absorber drum 11 through the pipe 43 with the pipe 42 leading to the receiving coil 13 is made as herein described, so that in case excessive pressure is developed in the absorber drum 11, during the time that the hot weak liquor is passing through the coil 14, that is to say, a pressure above condenser pressure, this pressure may be relieved by a flow of ammonia gas through the pipe 43 to said receiving coil.

In order that the work of the still and of the absorber may be as nearly as possible balanced so that the liquor in the still will not reach the predetermined temperature corresponding to the weakness that the apparatus is designed to work with before the liquor in the absorber drum 11 reaches or approximates the required degree of strength or saturation, the following construction is provided: A second valve 107 is placed in the main gas supply pipe 37 (said valve being shown in vertical central section on the right in Fig. 5) and being substantially like the fuel gas supply valve 36, except that the position of the valve disk 97$^a$ is placed on the side of its seat opposite to its stem 98$^a$ and the pressure of the spring thus acts to close the valve, while the pressure in the diaphragm tends to open the valve. A casing 106 is connected with the casing of said valve and contains a diaphragm for operating said valve. A pipe 105 connects said diaphragm casing with the top of the intermediary drum 12. As the pressure in the intermediary container drum 12 except when the valve 26 is closed, is the same as the pressure in the absorber drum 11, the pressure in the pipe 105 always represents the true back pressure. Should the absorption in the drum 11 at the beginning of the cycle be so rapid that a very low pressure exists in said drum, that is to say, a pressure below a predetermined low point, this pressure in the pipe 105 and in the casing 106 will not be sufficient to overcome the action of the associated spring which normally tends to close the valve, so that said spring will hold the valve disk of the valve 107 closed on its seat, thus cutting off the fuel gas supply to the burner 38, (except an amount sufficient to supply a pilot flame,) notwithstanding the fact that the valve 36 is open. Soon, however, as the pressure in the absorber rises above this predetermined low degree of pressure, indicating that it is catching up in its work with the still, the back pressure in the pipe 105 will be sufficient to overcome the spring and raise the valve disk of the valve 107 from its seat, thus eliminating the valve 107 from the operation of the apparatus.

While we have shown herewith a thermostatic device for opening the valve 56, to permit the strong liquor to pass from the absorber to the still, such thermostatic device is not essential to the operation of the apparatus and an ordinary check-valve, such, for example, as one of the check-valves shown in Fig. 4, may be substituted. In this case the valve will be so arranged that it will check and prevent the flow from the still toward the absorber, but will permit a flow from the absorber to the still whenever the pressure in the absorber is greater than that in the still. Thus, as already described, after the hot weak liquor has passed to the intermediary container and a partial vacuum has come to exist, as described in the still 10, the comparatively greater pressure produced in the absorber, by reason of the increase in temperature due to the heating of the strong liquor therein by the passage of the hot weak liquor through the coil 14, will force the valve open and produce a movement of the contents of the absorber to the still.

While in describing our novel apparatus for carrying out our process, we have referred to certain details of mechanical construction and arrangement, it will be understood that we are in no way limited thereto except as may be pointed out in the appended claims.

We claim as our invention:—

1. In an absorption refrigerating apparatus, in combination, a vessel adapted to act as a still, a vessel adapted to act as an absorber, an intermediary container adapted to receive the contents of one vessel while a transposition is made of the contents of the other vessel to the vessel whose contents have passed to the intermediary container, and means for applying the heat of the contents of the still to produce the required pressure to refill the still.

2. In an absorption refrigerating apparatus, in combination, a still, an absorber, an intermediary container, means for heating said still, conduits connecting said still, absorber and container adapted to permit transposition of the contents of the still and absorber through the medium of said intermediary container, means for imparting the temperature of the weak absorbent after it has left the still to the strong absorbent to drive said strong absorbent into the still, devices for controlling the flow through said conduits, and means for discontinuing the generation from said still when the absorbent therein has been reduced to a predetermined degree of weakness.

3. In an absorption refrigerating apparatus, in combination, a still, an absorber, an intermediary container, means for heating said still, conduits connecting said still, absorber and container adapted to permit transposition of the contents of the still and absorber through the medium of said intermediary container, means for imparting the temperature of the weak absorbent after it has left the still to the strong absorbent to produce the pressure required to drive said strong absorbent into the still, and devices for controlling the flow through said conduits.

4. In an absorption refrigerating apparatus, in combination, a still, means for heating said still, an absorber, and an intermediary container, and means for producing a transmission of contents from the still to the container, from the absorber to the still and from the container to the absorber when the contents of the still have been raised to a predetermined temperature, said transmission being separated by time intervals.

5. In an absorption refrigerating apparatus, in combination, a still, means for heating said still, an absorber, and an intermediary container, and means for automatically producing a transmission of contents from the still to the container, from the absorber to the still and from the container to the absorber, when the contents of the still have been raised to a predetermined temperature.

6. In an absorption refrigerating apparatus, in combination, a still, means for heating said still, an absorber, an intermediary container, means for cooling said absorber and container, and means for automatically producing a transmission of contents from the still to the container, from the absorber to the still and from the container to the absorber, when the contents of the still have been raised to a predetermined temperature.

7. In an absorption refrigerating apparatus, in combination, a still, means for heating said still, an absorber, an intermediary container, means for cooling said absorber and intermediary container, and means for automatically producing a transmission of the contents from the still to the container, from the absorber to the still and from the container to the absorber, when the contents of the still have been raised to a predetermined temperature, and means for automatically discontinuing the heating of said still in the interval between the time when it has attained said predetermined temperature and the time when it has received the contents of said absorber.

8. In an absorption refrigerating apparatus, in combination, a still, an absorber, and an intermediary container, means for cooling said absorber and intermediary container, means for heating said still, conduits connecting said still with said container, said container with said absorber, and said absorber with said still, the conduit connecting the still and the container being adapted to impart its temperature to the contents of said absorber, devices for controlling the flow through said conduits, means for discontinuing the heating of said still when the absorbent therein has been reduced to a predetermined degree of weakness, and thermostatic devices depending for their operation on the varying temperature of the absorbent for actuating said controlling devices for producing a transmission of contents from the still to the container, from the absorber to the still and from the container to the absorber.

9. In an absorption refrigerating apparatus, in combination, a still, an absorber, and an intermediary container, means for cooling said absorber and intermediary container, means for heating said still, conduits connecting said still with said container, said container with said absorber, and said absorber with said still, devices for controlling the flow through said conduits, the conduit connecting said still and said intermediary container, including a coil located in said absorber, means for discontinuing the heating of said still when the absorbent therein has been reduced to a predetermined degree of weakness, and thermostatic devices, associated respectively with said still, said absorber and said intermediary container, said thermostatic devices depending for their operation on the varying temperature of the absorbent for actuating said controlling devices for producing a transmission of contents from the still to the container, from the absorber to the still and from the container to the absorber.

10. In a refrigerating apparatus, in combination, a still, an absorber and an intermediary container, means normally open connecting the still and intermediary container including a device for communicating temperature from the fluid passing from the still to the contents of the absorber, means for opening communication between the still and the intermediary container, when the contents of the still have reached a predetermined temperature, means connecting said intermediary container and said absorber, means for positively closing communication between the intermediary container and the absorber when said predetermined temperature is reached, and means for opening communication between the absorber and the still when the contents of the absorber have reached a predetermined temperature.

In testimony, that we claim the foregoing as our invention, we affix our signatures in the presence of two witnesses, the said HARRISON H. SOUTHWORTH at Cleveland, Ohio, this 30th day of October, A. D. 1912, and the said CHARLES G. ARMSTRONG at New York city, New York, this 1st day of November, A. D. 1912.

HARRISON H. SOUTHWORTH.
CHARLES G. ARMSTRONG.

Witnesses to the signature of Harrison H. Southworth:
  H. A. HAUXHURST,
  W. C. SAEGER.

Witnesses to the signature of Charles G. Armstrong:
  ALICE L. McELWAINE,
  HOWARD HIPKINS.